United States Patent
Descatha

[11] Patent Number: 6,164,591
[45] Date of Patent: Dec. 26, 2000

[54] GROUND-EFFECT FLYING BOATS ALSO APPLICABLE TO AIRCRAFT, DRONES, AND SPACECRAFT

[76] Inventor: Michel Henri Descatha, 292 Kings Hwy., #A, Brownsville, Tex. 78521

[21] Appl. No.: 09/121,056

[22] Filed: Jul. 23, 1998

Related U.S. Application Data

[60] Provisional application No. 60/058,431, Sep. 10, 1997, and provisional application No. 60/053,866, Jul. 25, 1997.

[51] Int. Cl.$^7$ ........................................................ B64C 3/38
[52] U.S. Cl. .............................................. 244/48; 244/50
[58] Field of Search .............................. 244/12.1, 48, 50, 244/212; 114/288; 180/167

[56] References Cited

U.S. PATENT DOCUMENTS

| | | | |
|---|---|---|---|
| 1,041,489 | 10/1912 | Lake . | |
| 1,303,737 | 5/1919 | Spencer . | |
| 1,589,780 | 6/1926 | Wragg | 244/212 |
| 1,631,400 | 6/1927 | Collins . | |
| 1,742,082 | 12/1929 | Keller | 244/48 |
| 2,082,172 | 6/1937 | Mignet | 244/48 |
| 3,763,810 | 10/1973 | Payne | 114/66.5 |
| 3,830,179 | 8/1974 | Lippisch | 114/67 R |
| 3,884,171 | 5/1975 | Kline | 114/62 |
| 3,908,783 | 9/1975 | Joerg et al. . | |
| 4,124,180 | 11/1978 | Wolowicz | 244/82 |
| 4,596,368 | 6/1986 | Schmittle | 244/48 |
| 4,705,234 | 11/1987 | Bourn | 244/12.1 |
| 4,896,621 | 1/1990 | Coles | 114/274 |
| 4,967,984 | 11/1990 | Allen | 244/35 R |
| 5,018,686 | 5/1991 | Zimmer | 244/106 |
| 5,267,626 | 12/1993 | Tanfield, Jr. | 180/117 |
| 5,357,894 | 10/1994 | Jacobson | 114/272 |

FOREIGN PATENT DOCUMENTS

| | | | |
|---|---|---|---|
| 3804561 | 8/1989 | Germany | 244/12.1 |

OTHER PUBLICATIONS

"License to Fly", Popular Mechanics, Jul. 1989, pp. 57,59, 124,125.
"Welcome to the Wig Page", http://www.io.tudelft.nl/~edwin/html30/welcome.html, Feb. 1998.
"The Boat That Flies", Popular Science, Apr. 1992, pp. 57–59.
"When Ships Have Wings", Air & Space, Dec. 1995/Jan. 1996, pp. 52–59.
"Flying on Water", Popular Science, Jan. 1997, pp. 50–54.
"Wingships", Popular Mechanics, May 1992, pp. 35–38.
"Flaring High", Motor Boating & Sailing, May 1991, pp. 65—67,95.
"The Flying Ladder", disclosure by inventor, date unknown.
"Low Budget Homebuilt Ultralight", advertisement & Plans, Popular Science, date unknown.
"Ultralight Flea" (Nedo Lavorini), Kitplanes, Jan. 1990.

*Primary Examiner*—Peter M. Poon
*Assistant Examiner*—Francis T. Palo
*Attorney, Agent, or Firm*—Robert Platt Bell

[57] ABSTRACT

A Ground-Effect Flying-Boat system with a special hull producing a very low drag, but high lift, both in the water and in the air. A high pivoting-wing of an auto-stable airfoil, and one or more rear spoilers fitted on the hull-stern of the vessel having a special airfoil and determined horizontal and vertical slots producing very low drag, but a strong downward airstream deflection so as to increase the height of the ground-effect. The wing configuration allows for automatic maintenance of horizontal flight and automatic inclination in turns as well as an automatic anti-crash system against strong descendent gusts. These automatic stability features allow the craft to fly in rain or foggy weather without need of I.F.R. instruments, due to slide and spin resistance. In addition, the craft will not stall "nose down", but lose altitude slowly, with the hull remaining always practically horizontal. Water-landing is possible at a very reduced speed and even vertically into very strong winds and waves. The craft is easier and cheaper to build than conventional aircraft or seaplanes. The system can be scaled to craft of any size.

17 Claims, 6 Drawing Sheets

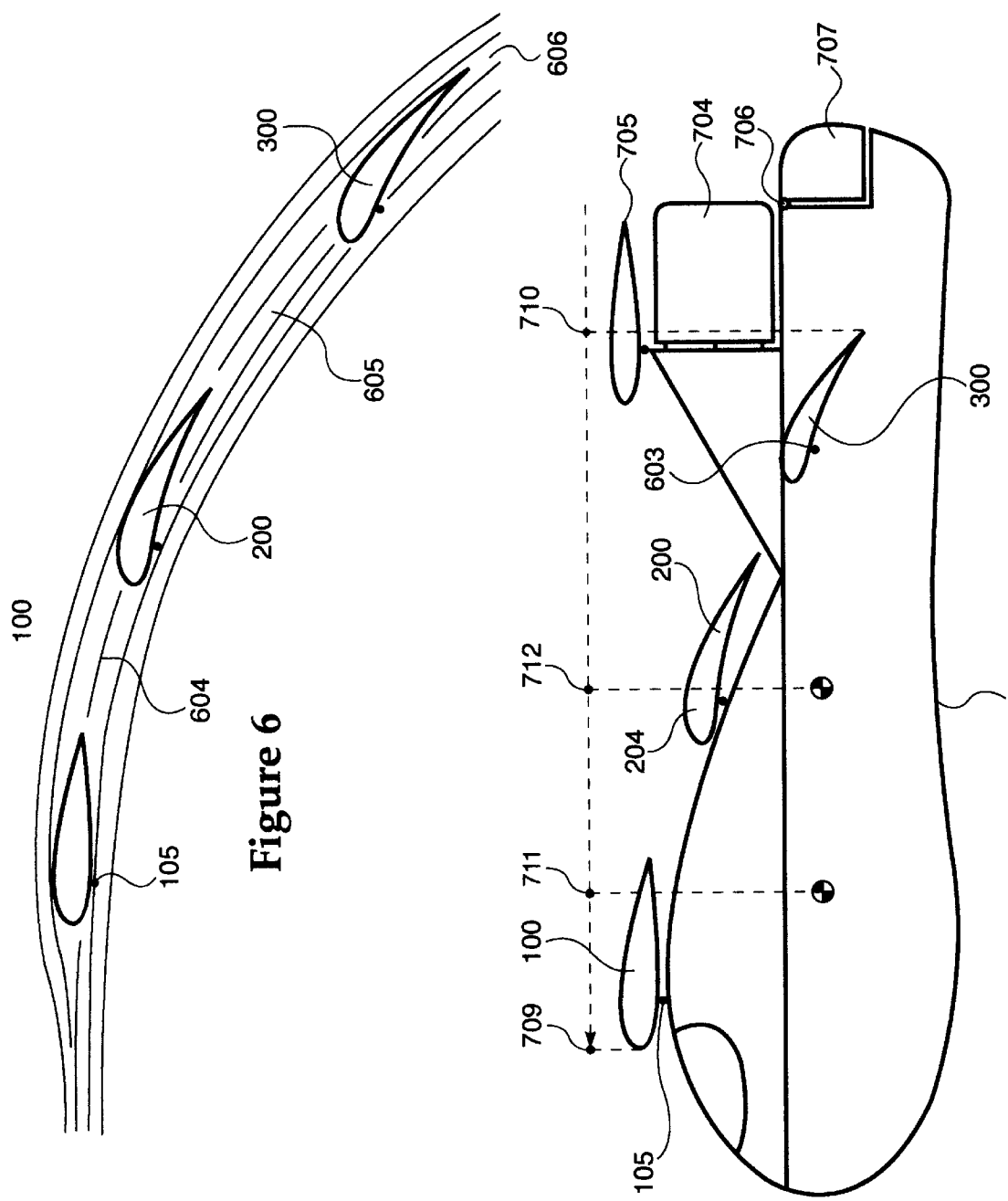

GROUND-EFFECT FLYING BOATS ALSO APPLICABLE TO AIRCRAFT, DRONES, AND SPACECRAFT

CROSS-REFERENCE TO RELATED APPLICATIONS

This application claims priority from Provisional U.S. Patent Application Ser. No. 60/058,431, filed Sep. 10, 1997, and Provisional U.S. Patent Application Ser. No. 60/053,866 filed Jul. 25, 1997, both of which are incorporated herein by reference.

FIELD OF THE INVENTION

The present invention relates to improvements in boats and vessels that are able to raise up out of the water and fly near over the surface, otherwise known as ground effect flying boats (GEFB) or ground effect flying vessels (GEFV).

BACKGROUND OF THE INVENTION

Ground effect flying boats (GEFB) or ground effect flying vessels (GEFV) differ from conventional seaplanes in that they are specially engineered to fly at or near the surface of the water, where their speed and the deflected airstream at the rear of their wings produces a ground effect or air cushion which substantially increases lift and allows flying with reduced engine power and low fuel consumption.

Such GEFVs may also be known as flarecraft™ because in aviation the final phase of landing through ground effect is called "flare". Flarecraft™ is a trademark of the Flarecraft Corp. of West Germany. Such GEFVs may also be able to flare over flat ground, such as beaches, marshes, deserts, icy lakes and rivers, icy polar zones, and the like, where ground effect may be produced.

When GEFVs fly exclusively over the water (lakes, rivers, oceans) and at a low altitude in surface effect, they are considered as boats and vessels and, as such, are regulated by the Marine and Coast Guard Administration.

GEFBs and vessels were experimented with for several decades, but their use was not widely popularized. Only recently have they awakened interest after realization that the Soviets have successfully built such crafts of all sizes, from single seat to 300 passengers and more, chiefly for military uses.

The advantages of GEFVs are numerous:

1. Considerable reduction of drag as soon as the GEFV is airborne, compared to a conventional vessel in the water, which has a density 800 times that of air.
2. Reduction of the engine power of 2 times and more compared to that needed by conventional seaplanes (which, when flying at higher altitudes, do not benefit from the increased lift of ground effect).
3. Comfort of passengers is increased with a smooth flight in the air, compared to the roughness of boats, and even compared with big vessels in the sea or large windy lakes.
4. Cruise speed is considerably higher than that of the conventional sea vessels, even in quiet weather.
5. Security is increased compared with aircraft because of the ability to water land instantaneously at any moment in case of engine or equipment failure or other sudden problem on board. A GEFV need not search or try to reach a convenient landing airport.
6. There are no limits of runway length, nearby tall buildings, or cross winds on takeoff or landing, as with conventional airplanes or airports. The wide extension of the water field allows orientation of the vessel to a headwind which is beneficial to reduce takeoff speed.
7. There are no problems in crossing over bridges or over harbor zones if necessary, because at such moments, with additional engine throttle, A GEFV may be able to fly over the top of the ground effect zone, with fuel consumption momentarily increased to clear the obstacle.
8. The ability to fly, in flare, without refueling, two or more times the distance of conventional aircraft or seaplanes of the same size are able to fly. This is of interest for civilian uses, and also for the military and Coast Guard to be able to roam coasts for extended periods of time and oceans to effect surprise due to the low radar detection due to the proximity to the water.
9. The cost of construction is cheaper, not only for small flying boats, but also for big oceanic and intercontinental vessels. At low altitude, there is no need for expensive pressurization systems, wing defroster equipment, sophisticated instruments, and certifications which are a must for the security in conventional aircraft.

Because of all of these and other advantages, GEFVs are of interest not only for small boats for recreation and fishing, and the like, but moreover for the intercontinental air transport companies which could substantially lower the price of such transport using GEFVs. It appears which for certain merchandise and freight, the cost of the transport with large cargos would compete with conventional marine ships, not only for reduced fuel consumption, but also for the reduced crew needed and the speed of merchandise delivery.

The former Soviet Union built numerous types of GEFV of all sizes from single seat to large capacity, chiefly designated for military uses. Today, Russia and the USA are both building such craft. Other countries are projecting building larger craft on the order of 1,000 passengers or more.

But according to research performed by the present inventor, it appears that actual building projects unveiled have undervalued some very important inconveniences. These projects do not seem to have addressed defects of GEFVs which are various and of great importance.

Sudden squalls, turbulence, and gusts are very dangerous because they are invisible and very frequent on oceans and large lakes, and even close to permanent in various zones of the world. Such wind disturbances may blow not only horizontally, but also vertically (e.g., wind shear), usually downward when near the surface of the water. Not only a small GEFB may be suddenly projected down over the water's surface, but the same may occur with an enormous GEFV.

The same turbulence also exist higher in the sky (although not so frequently) and there, even a big aircraft may suddenly lose hundreds of feet of altitude. At higher altitudes, however, such wind turbulence may not be a problem because the pilot has space and time enough to reestablish a normal flight. Such is not the case with a GEFV so near the water.

This danger is very serious because the impact with the water occurs within a fraction of a second (also because of the cruise speed of the craft), before the pilot has had time to pull the steering yoke to maintain altitude. The reaction time of an unwarned person is around ⅒th of a second, and at this time, even a light and slow GEFB is already crashed on the water's surface.

Such a crash happened in 1955 to an enormous US seaplane prototype Martin 275 designed to roam the oceans and refuel from submarines, powered by four Allison J71 Jets of 13,000 pounds of thrust each. This seaplane was flying at low altitude over the Potomac River, near Washington, D.C., when a sudden gush pushed it nose down into the water, killing all crew aboard. We know today that such a crash (and likely several others) occurred with a Soviet "Orlyonok" (small eagle) GEFV in the Caspian Sea with 150 military persons aboard with no survivors.

It is also noted that this same danger exists with the small agricultural aircraft sprayers which fly near and over crops. They generally do fly higher than the beneficial ground effect because these pilots know the dangers of these invisible and sudden gusts. Despite all their precautions, according to statistics, this activity suffers the highest rate of mortal injuries in small aviation aircraft, although these pilots have generally many hours of flight and much more experience than a GEFE sport enthusiast pilot would have who only flies occasionally.

Other dangers exist with the actual building projects of some Asiatic and Oceanic enterprises, also inspired by the soviet "Orlyonok" and "Ekranoplan" GEFVs, which have a low, strong and tight wing transversely fitted under the hull bottom and floats into the water at the same time as the hull.

In some contemporary GEFV designs, only the extremities of the "V" inverted wing touch and float in the water. In other GEFV designs, the wing tips are very near over the water surface which is also dangerous. If at the last second before watering, a sudden gust would incline the wing's span it would be very hazardous for a pilot (even an experienced one) to recover the exact horizontal wing level even with the help of ailerons.

Even if the craft could respond so quickly, it might be possible that the pilot would give too much counter inclination; and in which case the other wing tip would touch the water first and the possibility to make a water loop (e.g., ground loop on the water, or "water loop") on that side. Such a water loop could tear a wing from the craft on impact.

The second Martin 275 prototype identical to the one which crashed nose down by a sudden descending squall into the Potomac River suffered such a water loop. These two enormous seaplanes were identical, with a wing in an inverted "V" shape, where only the two tips were floating in the water at the same time as that of the hull. After this second accident, the program for industrial construction was abandoned.

If such waterings (i.e., landing on the water, or "watering") are hazardous with experienced pilots of the US Navy Seaplane Strike Force, it would also be hazardous with civil airline pilots, and even more hazardous with sporting pilots.

It is a fact that gyroscopic and electronic devices (quicker than the human reflex) could react instantaneously, but because of the force of inertia due to the span length, likely the correct horizontal level would not be obtained before contact with the water. Moreover, by watering with strong wind and waves, even with a perfect horizontal wing span, a wing tip could be situated at the last instant over a hollow, while the opposite wing tip could encounter and contact the top of a wave, and cause a water loop.

It seems unlikely that electronic equipment could suppress this problem. Some prior art devices claim the use of a skate-shaped wing tip which is supposed to slide over the water. However, the Martin 275 was also so equipped and the device did not prevent the craft from making a water loop. Because of the distance from the wing tip to the general center of gravity of the craft (situated in the hull), when a wing tip encounters resistance, it is multiplied by the length of the lever arm, and due to its length, the resulting force is enough to produce a water loop or seriously damage or destroy the craft.

Another problem with a GEFV is the considerable extra power needed only for the short time during take off. Such extra power is required to overcome the considerable drag of the transverse hull bottom step which is used (also in seaplanes) to produce water turbulence under the hull, and to prevent the waterstream from sticking on the bottom and thus make take off easier.

The extra power needed for take-offs in conventional GEFVs is a very serious handicap because one of the chief advantages of the GEFV is to be able to fly with low power engines. Once airborne the hull step continues to produce in the air the same turbulence and drag, which reduces cruise speed and increases fuel consumption. Such turbulence is a chief reason why a seaplane is slower than a land-based aircraft and why likely seaplane use was discontinued for oceanic transportation of people and freight.

Other dangers would be the possibility, in darkness or fog, to run into a large marine ship which may not have been seen by radar. To avoid this danger, the ideal solution would be to increase the height of the ground effect to allow the craft to fly higher. Some patents claim the use of flaps which are permanently louvered to send a deflected airstream more abruptly towards the water surface and increase the height of the air cushion.

These same flaps are used in aviation, chiefly for landing to increase lift and reduce speed, and effectively this system is very efficient and useful for such purposes. However, such flaps are always retracted in cruise flight because of the drag which would reduce cruise speed.

Another danger is the possibility of entering into a spin configuration near the water, because at this low altitude, there is not enough space to reestablish control.

Another difficulty with the GEFV (and with seaplanes also) is watering in strong wind and waves. Despite the reduced watering speed (due to the increased headwind), it is dangerous to encounter a moving mass of waves because their speed, added to the reduced speed of the craft, could cause a shock which could split the prow of the hull.

Another important danger for small and large GEFV alike is encounters with fog or rain (very frequent at some latitudes) where a pilot could not see the water surface (the same also occurs at night). In such situations, a crash with the water surface may be difficult to avoid.

SUMMARY AND OBJECTS OF THE INVENTION

A Ground-Effect Flying-Vessel system which comprises a hull bottom of a special shape without the conventional step which produces a very low drag, but high lift both in the water and in the air. A high pivoting wing of an auto-stable airfoil, and one or more rear spoilers fitted on the stern of the hull, with a special airfoil and with determined vertical and horizontal slots, with exact pitch in the descendent airstream, which also produces a very low drag, but a strong downward airstream deflection, all with a special location of the general center of gravity.

The present invention has several advantages. The GEFV automatically maintains horizontal flight and automatic inclination in the turns. In addition, the GEFV of the present invention provides an automatic anti-crash system against strong descendent gusts and squalls as well as the ability to safely fly by in rain or fog without need of I.F.R. instruments, because the impossibility of slide and spin. The GEFV of the present invention will not stall "nose down", but will lose altitude slowly, the hull remaining always practically horizontal. The GEFV of the present invention is capable of watering at a very reduced speed, and even vertically in situations where there are strong winds and waves.

All of these improvements are obtained without any electronic instruments, but by the arrangement of the lifting surfaces and by allowing the construction to be light and inexpensive by the reduction of hull length at half of that of a conventional seaplane due to the elimination of rear elevator and tail. This system may also be applied to other types of aircraft of any size, and also to drones, spatial satellites and other special uses.

Therefore, it is an object of the present invention that the GEFV would be able to take off very quickly, without the need of extra engine power. This improvement is obtained by the suppression of the conventional hull step used in all seaplanes, and substituting an easy to build bottom which produces a very strong lift with very low drag, not only into the water, but also when flying in the air where it acts as a supplementary lifting surface.

Another object is to suppress the danger of crashing into the water surface by the gusts and squalls, frequent in the big lakes and oceans, and even blowing permanently at certain latitudes. For this purpose, the system wears a wing of an auto stability airfoil which, when receiving a descendent gust, automatically takes a positive pitch and makes the craft instantaneously project upwards, instead of crashing on the water surface.

Another object is be to able to fly horizontally and to land on the water very slowly by means of a separated rear spoiler which strongly "sucks" the airstream proceeding from the pivoting wing and allows the pilot to give at this wing an important and unusual positive pitch and obtain a very low horizontal speed with full engine R.P.M.

Another object is the automatic maintenance of the horizontal level of the wing's span in straight flight, even in turbulence, and also the automatic inclination in the turns which avoids slide and entry into spin. All of these advantages are obtained by the determinate position of the lifting surfaces and the special place of the general center of gravity which allows complete elimination of ailerons.

Another object is the ability to land on the water very slowly and even vertically into strong winds as obtained by the pitching wing, the special rear spoiler, and the location of the center of gravity which reacts one with the other to obtain the required configuration with complete security.

Another object is to be able to fly in fog or by night, without I.F.R. instruments, in a position of security, even in the turns, because spin is impossible.

Another object is to increase the height of the ground effect to fly higher and with more security and without increasing the drag nor increasing engine power. This object is achieved due to the increased strength and more abrupt deflection to the surface of the rear airstream, obtained by the hollow lower camber airfoil of the spoiler(s).

Another object is to make a GEFV easy to fly, using only hands controls, in a similar manner to a boat (i.e., no pedals like aircraft and all other GEFVs known), in a way which even laymen could eventually learn to pilot alone (like with a boat), and without being an aircraft pilot.

Another object is to build the hull lighter and cheaper by reducing of its length by half. Prior art GEFBs and seaplanes have a rear elevator located at the end of their tail section. The present invention totally eliminates the rear elevator, thus allowing elimination of the tail which cuts down on weight and cost.

Another object is to obtain all these improvements by the use of aerodynamic principles which according to the laws of physics may not fail and thus make the craft simple, reliable, and inexpensive.

BRIEF DESCRIPTION OF THE DRAWINGS

FIG. 6 is a cross-section view of a pivoting wing slotted with two spoilers with hollow lower camber airfoils of the same chord and span as the pivoting wing, disposed in decreased levels one with respect to the other.

FIG. 7 is a side plan view of a large GEFV with a high pivoting wing slotted with two spoilers with hollow lower camber airfoils in decreased levels.

DETAILED DESCRIPTION OF THE DRAWINGS

Figure 1:
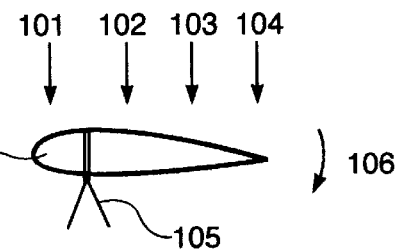
FIG. 1 is a cross-section view of an auto-stable bi-convex airfoil which is pivoting at a point situated at 25% of its chord.

FIG. 1 is a cross-section view of an auto-stable bi-convex airfoil 100 which is pivoting at point 105, situated at 25% of its chord. Arrows 101, 102, 103, and 104 illustrate pressure exerted by a descendent wind which automatically makes the wing pivot in the direction of arrow 106 (i.e., gives it a positive pitch).

Figure 2:
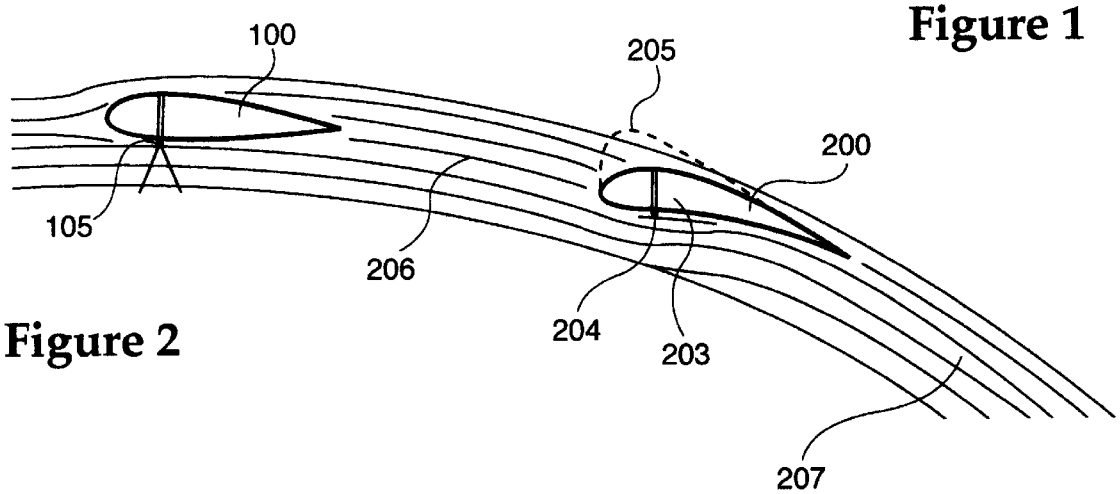
FIG. 2 is a cross-section view of the same auto-stable airfoil of Figure slotted with a spoiler of the same chord.

FIG. 2 is a cross-section view of the same auto-stable airfoil 100 of FIG. 1, pivoting at point 105, slotted with a spoiler 200 of the same chord, with a hollow lower camber aircraft airfoil 203 which is able to pivot at point 204. The large air pressure depression zone illustrated by dashed line 205 sucks down airstream 206 preceding from pivoting wing 100 which is then deflected downward as illustrated by slipstream lines 207.

Figure 3:
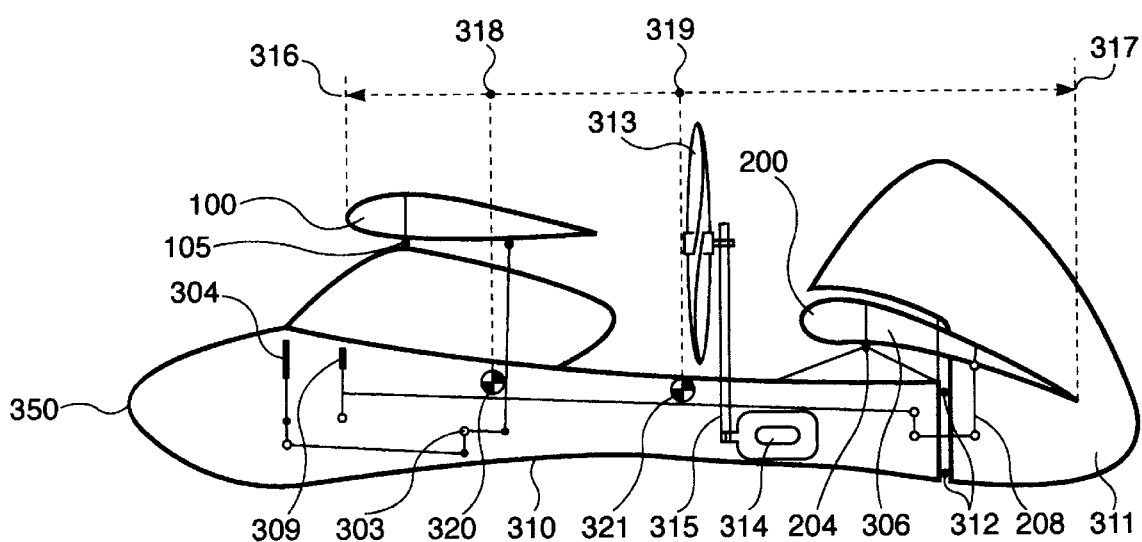
FIG. 3 is a side plan of a first embodiment of the GEFB of the present invention for seating four persons (two seats of two persons each).

FIG. 3 is a side plan of a first embodiment of the GEFB of the present invention for seating four persons (two seats of two persons each) with a high wing 100 pivoting at point 105 by the means of a rod system 303 connected to pilot stick 304. Spoiler 200 is of the same chord and span as wing 100 and of a hollow lower camber airfoil 203, able to be pitched on pivots 204 by rod system 208 from the pilot seat by the side lever 309.

The hull bottom is rectangular, flat transversely but hollow shaped in its longitudinal direction as indicated by reference numeral 310, (i.e., with a shape similar to the lower camber airfoil 203). Rudder 311 moves by the means of pivots 312 operated by pilot stick 304 and moved right or left to make the craft turn right or left by means of cables or other system (not shown) such as that used in conventional aircraft to move their rudders. Rudder 311 works both in the water and in the air. Propeller 313 is fitted on a pylon (not shown) and rotated by engine 314 through transmission belt 315.

The vertical position of the trailing edge of spoiler 200 is represented by reference numeral 317, whereas the vertical position of the leading edge of the pivoting wing 100 is represented by reference numeral 316. Position 318 is situated at 23% of the distance from 316 to 317 and 319 is situated at 40% of the same distance from 316 to 317. The distance from 318 to 319 represents the fore and aft limits of the general center of gravity, but its places are situated vertically underneath, in the hull, between the points 320 and 321.

Figure 4:
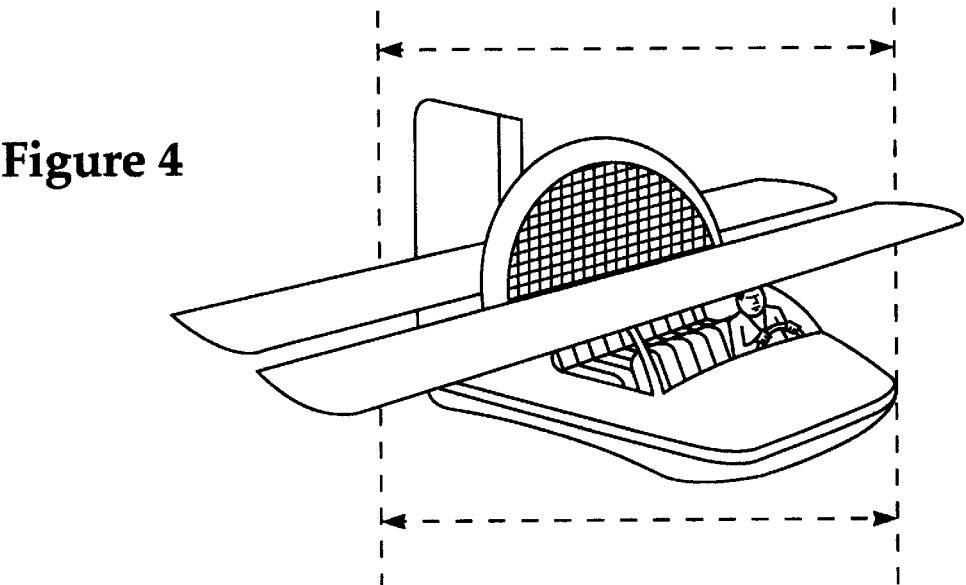
FIG. 4 is a perspective view of a four seat GEFB.
Figure 5:
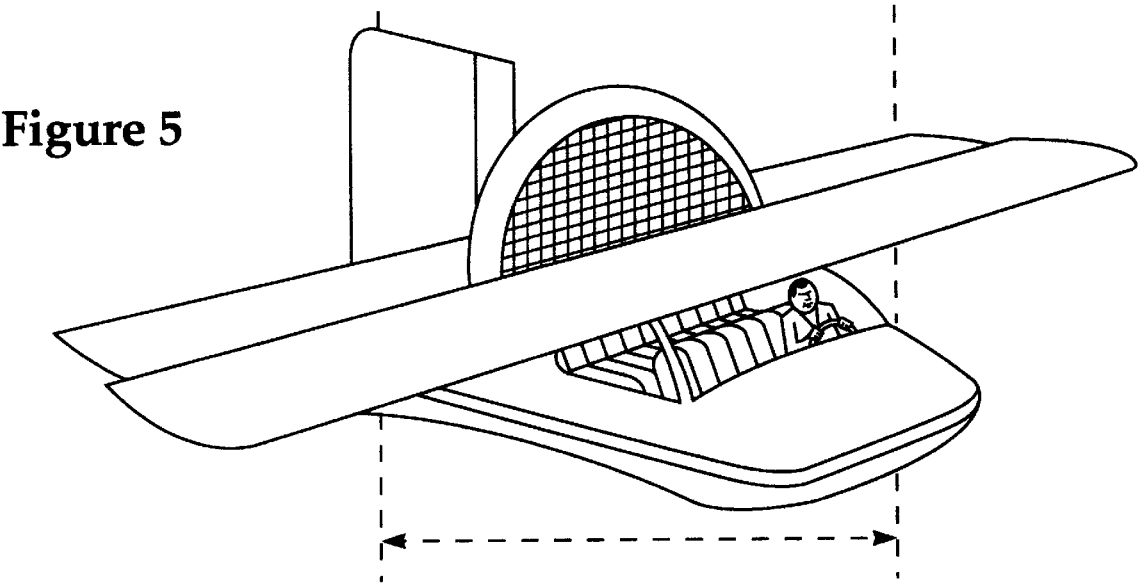
FIG. 5 is a perspective view of an eight seat GEFB.

FIGS. 4 and 5 are the perspective views of the respective four seat and eight seat GEFBs which illustrate that for both capacities the hulls have the same length (only varying widths) and thus do not affect the center of gravity, which always lies inside the fore and aft limits however the number of passengers aboard. Thanks to the lift of the spoiler, the travel of the CG is around 4 feet for both crafts, whereas for a conventional aircraft of the same capacity, it would be of only some few inches around the lift and drag moment (aerodynamic wing center).

FIG. 6 is a cross section view of a pivoting wing 100 slotted with two variable pitch spoilers with hollow lower camber airfoils 200 and 300 of the same chord and span as the pivoting wing, and disposed in decreased levels one with respect to the other (always the same disposition as that in FIGS. 2 and 3). Elements 604, 605, and 606 illustrate the different degrees of deflection of the airstream.

FIG. 7 is a side plan view of a large GEFV with its high pivoting wing 100 (always an auto-stable airfoil) slotted with two spoilers 200 and 300, having hollow lower camber airfoils in decreased levels.

Element 704 is the rudder and element 705 is the variable-pitch stabilizer. Element 706 is the hinge to open up the wide rear door 707. Element 708 is the hollow lower camber shape of the transverse flat hull bottom. Element 709 is the vertical limit of the leading edge of the pivoting wing 100.

Element 710 is the rear vertical limit of the trailing edge of spoiler 300. Point 711 is 23% of the distance between points 709 and 710, and point 712 is the 40% of the same distance. Points 711 and 712 form the limits of the center of gravity for the craft of FIG. 7.

DETAILED DESCRIPTION OF THE INVENTION

The ground-effect flying boats (GEFB) and the ground-effect flying vessels (GEFV) of the present invention wear a high-positioned pivoting wing of an auto-stable airfoil as illustrated in FIG. 3, where the pitching-moment remains close to or at the same place of the chord indifferently of the speed of the craft, or the various pitches given by the pilot's steering wheel, for the various flight configurations as take-off, flight-level and water-landing (watering).

Due to the very small variations in pitching moment (the main spar of the wing and the pivots are fitted at this same place), the resistance of the steering wheel by push and pull in flight is thus low, and even in horizontal flight, this wing maintains itself automatically at the horizontal level by the aid of a conventional small tab fitted on its trailing edge and trimmed from the cockpit (not shown in FIG. 3). The pivots are fitted at the place of the pitching moment which is situated at around the 25% of the chord. The airfoil 100 may be selected from that family of airfoils known as the NACA 2.30 family or other stable pitch moment airfoils well known in aviation.

Due to pivots 105, wing 100 of FIG. 3 is pitched by a push-pull rod-system 303 from the pilot's stick 304 (or a steering wheel in other construction), which when pulled, gives a positive pitch at the wing to take altitude and vice-versa, (i.e., the same movements with conventional aircraft). With this arrangement, conventional elevators which prior art aircraft place at the end of a long tail are obsolete, eliminating both the tail and conventional elevator and thus reducing weight and length of the hull of close to half.

Even during strong variations in the pitch of wing 100, the hull remains always close to horizontal due to pivot 105, which is an advantage, chiefly in take-off and watering. Once a selected altitude is reached, the pilot may adjust the small trim tab for a horizontal flight, which is maintained very easily allowing "hands-off" flying. In fact, when flying in ground-effect, this practice would be dangerous, if the pilot would have to make an immediate altitude correction (e.g., to clear an obstacle). However, the hands-off capability of the craft illustrates the underlying stability of the design.

At near-zero altitude, gusts may blow not only horizontally (which is not dangerous), but also blow vertically (downward), which would project a flying boat (and also a seaplane) onto the water surface. In the present invention, thanks to the pivoting wing, the GEFV will automatically counteract such gusts and make a strong jump upward.

As illustrated by wing 100 in FIG. 1, where pivot 105 is located at the 25% of its chord, wing 100 receives 25% of the descendent wind as indicated by arrow 101, and 75% aft, as indicated by arrows 102, 103, and 104. As a result, wing 100 will automatically take a positive pitch, as indicated by arrow 106. This pitch change is so quick and strong, that the craft will jump at the same instant in the air, without having lost any amount of negative altitude. The faster the craft is flying and the stronger is the descendent wind, the faster and stronger is the automatic jump.

This "intelligent wing" is particularly applicable invented for GEFV use, and it is somewhat astonishing that it was never used for this special purpose, prior to the application thereof by the present inventor.

When the craft makes such a jump to the sky, it is because it has entered into a turbulent zone, and when the movable wing first pulls the stick (or steering wheel) to the rear, the pilot will follow that movement with his hand, without resistance to it. Immediately afterward, however, the pilot may maintain the stick pulled back to gain some altitude as a precaution, because likely the craft has just penetrated into a zone of turbulence.

Once flying at a prudent altitude, it may be necessary to give at the trim tab some more incidence to pursue a horizontal flight, because the lift may have decreased due to the decrease in ground-effect at a higher altitude. Ground effect may even be totally suppressed if the vehicle is flying higher than its top limit. Ground effect may also be reduced if the pilot has reduced cruise speed as is generally done when flying into a turbulent zone.

Thus, the stick will continue to push and pull, sometimes strongly and quickly because the wing follows the up and down movements of turbulence without losing any altitude because one movement compensates the other. Due to the pivoting, the "intelligent wing" does not suffer the shakes of the airstream (which occurs in conventional fixed-wing aircraft). The continual movement of the steering wheel indicates that the wing effectively follows turbulences up and down. For the security of the craft structure and the comfort of the passengers, the pilot should gently follow the push-pull of the steering wheel because this free pivoting absorbs automatically the shakes at the wing and at the hull.

Pivoting wing 100 (FIG. 3) nor spoiler 200 need ailerons because of their high positions. The general center of gravity of the craft is situated under the lifting surfaces, and for this reason, the wing span is automatically maintained at horizontal level in straight flight, because of the pendulum effect. In turns, the inclination of the wings is also automatic, thanks to the effect of centrifugal force. For this reason, no slide indicator is needed and if such a one is fitted, it would be observed that its ball (or needle) would always be positioned at the correct place, even in the most inclined turns.

Of course, while in the first two or three seconds of a turn, the ball may move somewhat away from zero, but quickly returns at its place which indicates that the original slide is stopped. To reduce slide even further, the wing tips could be somewhat raised up, but this is not necessary for security. With respect to ailerons, their use would be dangerous because, at least for the small GEFBs which have to be operated chiefly by sporting and marine people, it would be very easy for an inexperienced pilot to put the craft in a spin configuration.

Controlling rudder and ailerons is an art and requires skill obtained with several hours of flying school, not only for the correct inclination, but also to learn how to reestablish control after entering into a spin. With the GEFB of the present invention, with the automatic inclination and the "all hands" control (no pedals), an unexperienced person may learn to drive alone because of the extended "water runway" which doesn't limit the length nor the time of watering, and without the cross wind difficulties, the pilot would generally have space to orientate the craft toward the wind which would make a slower and easier take-off and watering.

There still remains the difficulty when watering to estimate the exact vertical distance from the craft to the water. Moreover it is very difficult to estimate the distance to the water surface when the water has a glassy surface when there is no wind. The water may look like a mirror and often seaplanes crash because the pilots did not realize the water was so near. One object of this invention is to increase the positive wing pitch before stall and so be able to water slower than the known GEFBs and seaplanes.

It is known that when a wing is pitched around 15 positive degrees, suddenly the airstream "unsticks" from the upper camber surface of the wing. As a result, and all at once without previous warning, the aircraft stalls nose-down or enters into a spin. The same occurs even in horizontal flight when the speed decreases under the stall limit. One object of this invention is to allow a GEFB to fly under this limit without stalling suddenly nose down, but rather only lose altitude slowly while the hull remains horizontal.

This invention adopts a system similar to spoilers fixed at the rear part of the full width of the trunk of some modern cars. Such spoilers in a way to suck the descendent airstream from the roof and slide it down along the inclined rear window so as to avoid turbulence in that zone and increase the top speed and the stability of the vehicle.

This technique is also used in aviation but with a different disposal. A narrow wing, known as a "flaperon" which some light aircraft are fitted with, some in the rear and some near the trailing edge of the wing in its entire span, effectively sucks the descendent airstream from the wing and then to give some positive degree of inclination to the aircraft before stall. This narrow wing is termed "flaperon" because it is made of two independent moving parts which may be used as flaps or as ailerons.

Aircraft so equipped are said to be S.T.O.L. (Short Take-Off Landing), but this system produces strong turbulence and drag in the small horizontal and vertical slots. Industrially built, such two seat aircraft available in the U.S., with flaperons, have a top cruise speed of 88 miles per hour, but fly at 130 miles per hour when not equipped with the "flaperons." The decreased speed with flaperons is due to increased turbulence and drag they produce.

The present invention claims a different disposition which draws considerably more of the descendent airstream which proceeds from the pivoting wing, and so the ability to give to it a more positive inclination before stall, along with a very low drag while not reducing cruise speed. The system consists of a large single piece spoiler 200 illustrated in FIG. 3 which is not fitted at the trailing edge of wing 100, but at the rear part of the hull.

Spoiler 200 may preferably be of the same chord and span as the pivoting wing 100 (i.e., with a very significant surface area) which consequently produces a very significant depression zone as illustrated in FIG. 2 by dotted line 205. For this reason, spoiler 200 strongly draws the descendent airstream 206 of pivoting wing 100 which gives it some 10 degrees more inclination before stall than conventional aircraft provided with flaperons.

Thus, the craft has the ability to fly at a very reduced horizontal speed and even with full engine throttle, and make turns of 360 degrees with a very reduced radius. Experiments in flight have shown that the horizontal slot could be increased until the distance of the chord length of the pivoting wing, where the sucking effect was still very strong, and that the vertical slot between the pivoting wing 100 and the spoiler 200 were giving the best result when the vertical distance was until the 25% of the pivoting wing chord.

Experiments in flight have proved that this disposal was seven times more beneficial than a conventional structure as follows:

1. The major horizontal and vertical slots do not create the large drag of flaperons and consequently the cruise speed is not reduced, but somewhat increased because the acceleration of the descendent airstream on the upper camber airfoil of the pivoting wing (FIG. 2, element 100) due at the strong depression zone, as indicated by dotted line 205 in FIG. 2, which allows it to maintain horizontal flight with an insignificant positive wing pitch and consequently with reduced drag.

2. The stall speed limit is strongly decreased due to the major surface of the spoiler (FIG. 3, element 200) because it is also used as a second lifting surface which lightens the load of the pivoting wing of up to close to half, and for this effect the general center of gravity (C.G.) is able to be moved far aft to load the spoiler's surface. The GEFB prototype of FIG. 3 flies nicely when its general C.G. is situated at point 318, i.e., at 23% of the total distance between the leading edge 316 of pivoting wing 100, and the trailing edge 317 of spoiler 200. Because of the identical surface area given at the spoiler 200, the general C.G. may be moved back until point 319 which is 40% of this same distance between points 316 and 317, and also at this extreme rear location, the craft flies nicely and with security.

Experiments were done to move the C.G. up to 48% and the craft was always stable, even at the very low stall speed limit. When speed was reduced further, the fore wing would slowly stall first, but with sudden turbulence. With sudden turbulence, such an extreme rear C.G. would be uncertain, and it is why the 40% rear limit is recommended for total security. With conventional aircraft, it is the wing (and not the tail) which must stall first, and the same rule is also applicable here.

The important difference is that with conventional aircraft, the C.G. has to be located at around 25% of the wing chord, and may be moved fore or aft only a very few inches. Here, with four to eight seats, the range from 318 to 319 is approximately four feet, and thanks to this distance, the C.G. remains easily between these limits when the craft is flown with the sole pilot or a full compliment of passengers aboard.

3. It is difficult to enter into a spin configuration because the well known anti-spin effect of two parallel slotted surfaces of the same span, and here the difficulty of spin becomes a total impossibility with the general center of gravity situated under the surfaces of lift, and the lack of ailerons to produce a spin.

4. The increase of the upper limit of ground-effect allows flying higher over the water surface is also an increase in security. The spoiler 200 of FIG. 2 is positioned at a vertical downward gap of 25% of the chord of pivoting wing 100 (as it is exactly represented in the drawings). In horizontal flight pivoting wing 100 has a positive pitch of around one degree. Because the lower level of spoiler 200 and its sucking effect 205, airstream 206 has an incidence of around twelve degrees (as exactly represented).

If the spoiler 200 is positioned through the pilot's lever at the same twelve degrees, it will receive the descendent airstream parallel at its chord, the drag will be the minimum and the lift will be low. If the pilot gives one degree more at spoiler 200, drag and lift will increase and will be the same as that of pivoting wing 100, and because of its same lift capacity (because of its same surface area), it will be able to load it until 40% of the total weight (i.e. the C.G. until point 319).

Spoiler 200 is not a biconvex auto-stable airfoil (as is pivoting wing 100), but a hollow-lower-camber airfoil. Such shape of airfoil is selected here because there is no problem if its center of lift moves on its chord as this airfoil is maintained steady (no free-pivoting). Its advantage is that its degree of deflected airstream near its trailing edge is greater and may be at least 17 positive degrees with a relative low drag. For this reason, this airfoil shape is used in numerous light conventional slow aircraft.

Spoiler 200 is positioned by the pilot with an incidence of 12 degrees (that is the incidence of the descendent airstream 206) and it adjusted to 1 degree more, for a total of 13 degrees. The normal deflection of the hollow lower camber airfoil 203 is of around 17 degrees, and thus the resulting deflected airstream 207 is of 13+17=30 degrees. This theoretical calculation and the abrupt and strong deflection 207 were verified in flight with wool treads glued at the trailing edge of the spoiler 200. This same system was also used at the pivoting wing 100 to observe the trajectory of the descendent airstream 206 and the strength of the sucking zone 205.

The same disposal could be used for a large GEFV as illustrated in FIG. 7 where there would be room enough to fit a second spoiler 300 (and even more if the hull were long enough). As illustrated in FIG. 6, the descendent airstream rear of the first spoiler 200 would be approximately 30 degrees as illustrated by streamlines 605 (as in the deflected airstream 207 of FIG. 2). The second spoiler 300 could be pitched also at 1 degree more (i.e., at 30+1=31 degrees) and the deflected airstream 606 would be approximately 17 degrees more (the normal deflection of the hollow-lower-camber airfoil) i.e., 31+17=48 degrees.

This more abrupt airstream deflection obtained would increase the height of the air cushion and with the high cruise speed of such a big craft would strengthen the power of the deflection. FIG. 7 shows how a big GEFV with its pivoting wing 100, its spoilers 200 and 300 of hollow-lower-camber airfoil, the rudder 704 and an elevator 705 which could be useful to pull the load more to rear (without exceeding 48% of the aft C.G. limit) and provide more flight stability.

With respect to the height of the ground-effect, it was verified in flight that with the prototype of FIG. 3, with two persons aboard and its wing span of 18 feet, it was able to fly at 11 feet high (the 60% of its wing span) at 2,000 engine RPM (which according the manufacturer's data gives a power of 12 HP). If this same craft flies at 18 feet high (the same as that of its span length), the RPM needs to be increased to 6,000, which corresponds to 35 HP for its two-stroke engine. With the spoiler system here claimed, the ground-effect is at around 60% of its span, which is around twice the one obtained with the orlyonok (and the other GEFBs known).

It is also noted that the increased lift of the present system is also beneficial out of ground-effect because a conventional aircraft needs around 20 HP more (i.e., 55 HP) to be able to fly with two persons. It was also tried to fit the engine and propeller-reduced-shaft (ratio 3:1) at the prow of the hull with a 72" propeller (a bigger diameter is possible with a 1:3 reduction ratio) in a way which could blow air over both the pivoting wing and spoiler at the wider span. As expected, this disposal resulted in an increase of 2 feet (an altitude of 13 feet) in the height of the ground-effect, (i.e., 75% of the 18 feet wing span) because of the quicker speed given at the airstream over the lifting surfaces and the stronger rear deflection. This disposal would be of interest in less populated zones, but where there are numerous people and boats, there may be a lack of security. The propeller itself is better protected as located in FIG. 3.

According to experiments related above, the preliminary calculations for a large GEFV (as shown in FIG. 7) and with a wing span of 200 feet (like that of the Boeing 747) and flying at 400 MPH (which it is able to exceed with new turbo propeller blade designs which are very economical in fuel consumption compared to the jet engines), the speed and the strength of the deflected airstream would be tolerably increased (compared to the one obtained with the prototype of FIG. 3, which cruises at only 60 MPH).

Moreover, this deflection would be increased because it would not be a problem of security with a big GEFV if the propellers were fitted before the pivoting wing which would blow air over all the lifting surfaces, and moreover by increasing the number of propellers, they could blow air over a greater part of the span. With such turbo propellers, a speed of 400 MPH may be easily reached because that was the cruise speed of the Lockheed L-188 Electra (first flight year 1957) with its 4 turbo engines of only 3750 SHP each, without the recent new propeller blade systems which we have today.

With all these arrangements referred to herein, the ground-effect's height of 100% of the wing span (200 feet) would be easily over passed, but even if not, this height of 200 feet provides total security to prevent wave contact by night or during fog against large ships cruising over the seas. Of course, such a big GEFV could be also jet powered and fly around 600 MPH (like the Boeing 747) and likely the ground-effect height would be increased over 200 feet. If a jet-powered craft were powered to fly at supersonic speeds, flying at the near-zero altitude of ground-effect would not disturb the ozone layer as do conventional SSTs flying at 50,000 feet or more.

5. The spoiler disposal not only allows flying very slowly, but even to watering vertically into very strong wind and waves when the speed of the wind is higher (or the same) than the stall limit speed of the craft. Effectively, if this stall occurs at 40 MPH (which is the case in the GEFB of the FIG. 3 with only the pilot aboard), and if the fore wind is also of 40 MPH and if the speed indicator of the craft also indicates 40 MPH, it will fly stationary with respect to the ground. If the driver pulls some more on the steering wheel, or reduces the engine RPM, the craft is no longer able to fly horizontally, and will lose altitude and stall vertically and slowly at a speed which may be controlled by the pilot, by pushing the steering wheel slightly, and the hull loses altitude always in horizontal position, because of the pivoting of the "intelligent wing."

Conventional aircraft and seaplanes would be able to do the same (always into a strong wind as noted), but in the practice they do not do because their ability to stall nose down and enter in spin at their stall speed limit (which is impossible with the present system).

To better understand the handling and possibilities of this invention, if one is flying at a relatively high altitude in the present invention, without any headwind, when pulling the steering wheel back and putting the engine into idle (or stopped), a stall occurs with the same ease and security with a close to vertical drop. Without a headwind, vertical speed may not be regulated, but remains steady all the time in a relationship to the total weight of the craft and its wing surface. This vertical loss of altitude may be performed even by an unexperienced pilot, and to reestablish the normal horizontal flight before landing, one only has to push the steering wheel forward and increase the engine throttle to recover a normal horizontal flight speed as it is done with a conventional aircraft.

6. This system allows flying in dense rain or fog which would impede vision of the water surface. In this case, it is necessary to take some altitude of security, and this blind flight is able to be realized without the I.F.R. instruments which are mandatory with all the conventional aircraft. Effectively with such GEFBs, if the pilot maintains the required engine RPM and the altitude and the compass are steady, the pilot may be certain which the craft is flying straight and level.

For a small GEFB, it would be prudent to return to a zone of visibility, and a turn of 180 grads in the fog is not dangerous as the system inclines automatically the wing span at the required incidence. Of course big GEFVs might pursue a straight course, and certainly they would also be equipped with the I.F.R. instruments which would be an extra security. This ability is of the greatest importance because the conventional aircraft may not fly without ground visibility (even for a few minutes) if they are not equipped with the I.F.R. instruments, which require several hours of schooling and constant practice.

Even with this equipment, if a conventional aircraft enters in spin, without the visibility of the ground, it is practically impossible to reestablish the correct flight, and as noted above, stall and spin are the chief cause of the fatal accidents in small aviation, and not only by "blind" flight but even in daylight. In I.F.R. conditions, in conventional aircraft, it is quite common for even experienced pilots to become spatially disoriented and enter into a fatal stall/spin condition.

7. Another improvement is the quick and easy take-off without the need of an extra powerful engine, because a special shaped hull bottom which produces a very low drag but a strong lift, not only into the water, but also once in flight. The conventional hull step used in seaplanes and all the GEFVs known is eliminated and substituted by a rectangular bottom hull, flat in all its transverse, but with a hollow lower camber shape in its longitudinal direction (Element 310 in FIG. 3), which is no more than an adaptation of an hollow lower camber aircraft airfoil (as used in spoiler 200).

The drag of the flat surface into the water is very low, and also thanks to its curved prow 350, as soon as the craft gains some speed, the bottom raises up and slips on the water surface easily, which allows speed in a few seconds. But the waterstream continues to "stick" on the bottom and always remains the same difficulty to put the craft airborne, which here is easily solved by the "intelligent" pivoting wing. When the craft begins to run in the water, the pilot pushes the steering wheel the necessary amount to maintain the wing horizontal (where the drag is minimum) and very quickly the necessary speed for take-off is reached.

Then, the pilot pulls the steering wheel to give the wing a few degrees of positive pitch, and because the strong lift due to its total surface, the craft makes an instantaneous jump into the air, without having had time to lose any speed and this operation is effected in 5 to 10 seconds. This take off is still easier if the two vertical lateral sides of the hull are protracted down of some 4 or 5 inches which have the same effect in the water as the winglets at the tips of an aircraft wing, and here impede the water to escape at each side of the hull, which allows use of this lost power as extra-lift because the rectangular surface of the bottom works like a wing of strong lift both in the water and then in the air, due to its hollow lower camber aircraft's airfoil.

It is noted that the pitch given in flight at the spoiler(s) by the pilot is useful with a prototype to encounter in flight the best pitch, but once determined, it does not need to be modified more, and the spoiler may be definitively fastened at this position for an industrial construction, where the lever 309 may be deleted to simplify building and piloting of the craft. This deletion is valid for the GEFB and vessels of any size.

With respect to the use of the spoiler here claimed, it may appear to the uninitiated as a mere tandem wing. However, a specialist in aerodynamic fluids will understand how the present system works. The chief purpose is to suck the pivoting wing descendent airstream and deflect it more abruptly and strongly to rear which is not done in the numerous patents and tandem wings aircraft prototypes known, and have not been built for the ground-effect use.

Prior art tandem wings have been fitted at various places: over, level or under the fore wing, with horizontal and vertical slot distances and without having considered or verified the exact airstream travel nor the drag and lift disturbances originated by the disposal.

Figure 8:
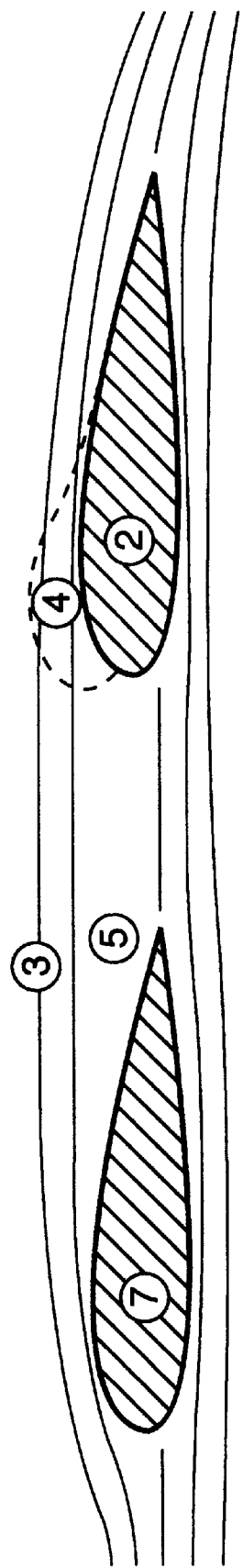
FIG. 8 is an airflow diagram illustrating the airflow over tandem wings lying in the same plane.

For example, in FIG. 8, if tandem wing 2 is fitted at the same horizontal level as a fore wing 1 (which is a frequent disposal), the trailing edge 5 of fore wing 1 is situated at a lower level of some inches than the top of the leading edge of tandem wing 2. In other words, the trailing edge 5 of fore wing 1 is located some inches under the upper suction zone 4 of the leading edge of tandem wing 2 (increased by the thickness of its airfoil).

In such case, the airstream 3 proceeding from fore wing 1 is sucked-up and doesn't follow down the cambered upper airfoil of tandem wing 2 until its trailing edge. From the top of the leading edge of fore wing 1 until its trailing edge 5, a void zone is created throughout its entire length, creating strong vortices and strong drag, with the loss of lift all along the span's length (if the tandem wing has also the same span's length) and such inconveniences are strongly increased if the tandem wing is fitted higher or lower at wrong place and with wrong slots distance.

FIG. 8 illustrates the chief reason why, with the same engine power, tandem-wing aircraft are generally slower (and often very much slower) than the conventional aircraft single wing, and likely they are not industrially manufactured because it was not researched the exact place and pitch to give at the tandem wing, as claimed in the present invention in the way to obtain the best results.

Figure 9:
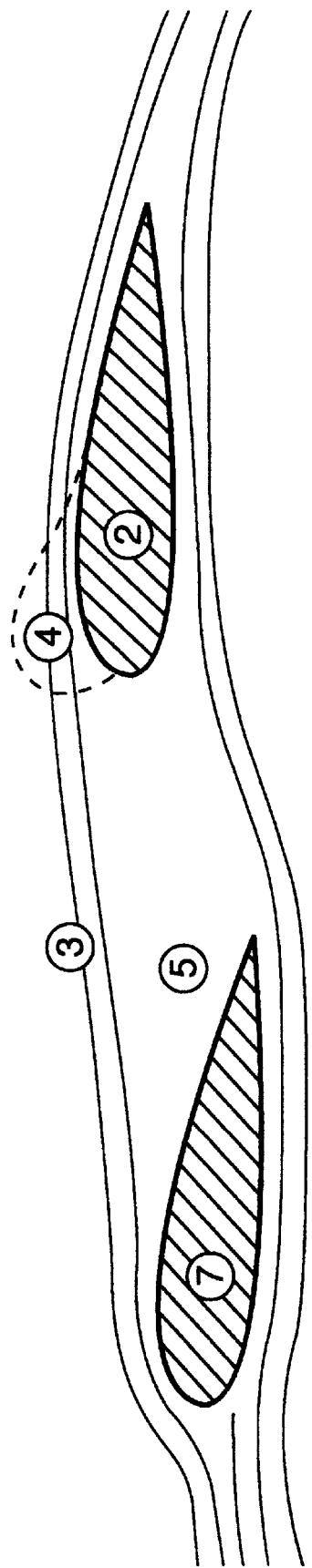
FIG. 9 is an airflow diagram illustrating the airflow over tandem wings with the rear wing lying above the plane of the front wing.

FIG. 9 illustrates an example where a tandem wing 2 is fitted higher than fore wing 1. The void zone created at trailing edge 5 and turbulences therefrom are even stronger as the descendent airstream is forced upward since the leading edge of fore wing 1 and the upper camber 4 does produce more lift.

Figure 10:
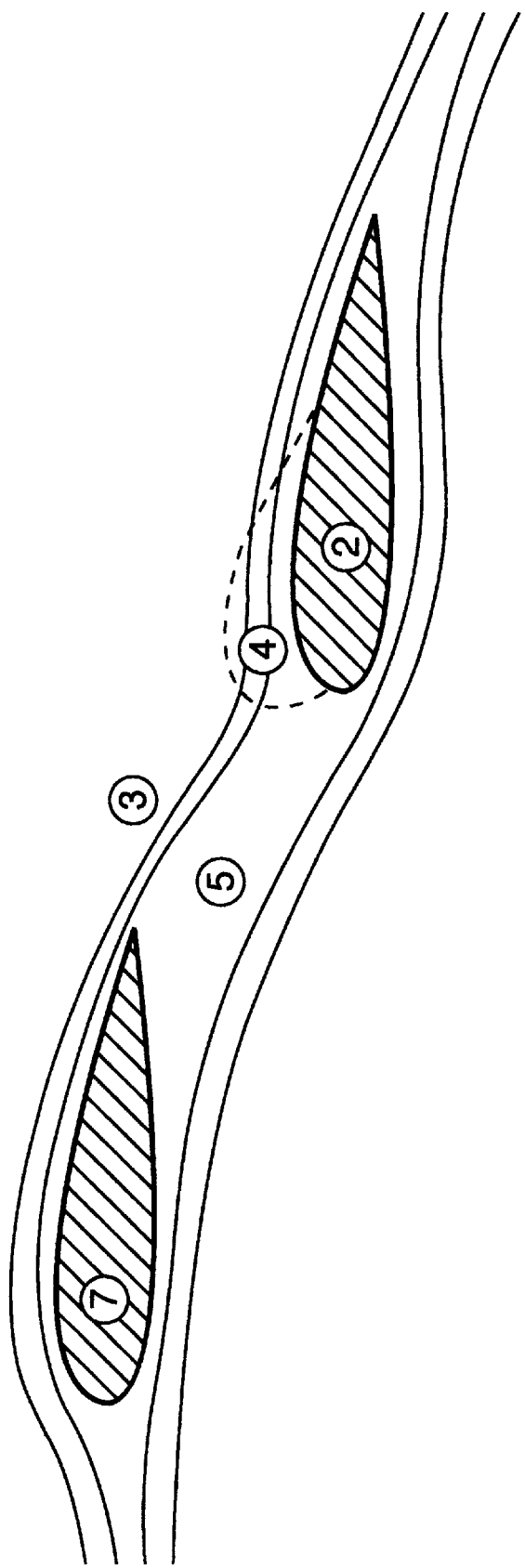
FIG. 10 is an airflow diagram illustrating the airflow over tandem wings with the rear wing lying below the plane of the front wing.

FIG. 10 illustrates an example where a tandem wing 2 is located lower than fore wing 1, but located too closely to fore wing 1, as in many prior art aircraft. The descendent airstream 3 is pulled down by depression zone 4 and is directed too abruptly downward, and this accelerated descending airflow produces an air curtain all along the span of fore wing 1, creating a new source of significant drag and consequently a much lower cruise speed than conventional aircraft of the same engine-power.

This detailed explanation is to show how important the span, chord, pitch and slots are when using the tandem wing (herein referred to as a spoiler) of the present invention, as well as the importance of the relative location thereof as claimed in the present invention.

It is also noted that test flights have confirmed that the system herein described allows the craft to remain flying automatically at maximum ground effect without tendency to raise or sink.

When flying at a steady cruise speed determined by the pilot (with steady engine R.P.M.), a small conventional Flettner control (e.g., trim tab) at the trailing edge of the pivoting wing will maintain the altitude automatically at maximum ground effect height. The craft effectively remains at that altitude, even in a zone of turbulence, because each descendent gust is immediately followed by an ascendent gust, allowing the horizontal altitude to be maintained.

If for some reason, the craft would begin a light ascension (and go to fly over the top of the ground effect zone), the fore wing would immediately receive less lift, while the rear spoiler still flies into the ground effect and with maximum lift. Automatically and immediately, the craft noses down, until the fore wing again enters the top of ground effect, and automatically reestablishes horizontal flight.

The wing disposal here claimed is able to realize this automatic level flight without having to use expensive electronic devices as the present invention is based only on variations in air density (depending on the laws of physics) which are fail-safe and cost nothing:

To the inventor's knowledge, no patent (nor concrete realization) has used the ensemble of embodiments herein described to solve the problems and security of the Ground Effect Flying Boats and Vessels. The present invention may also be used in these special crafts and also in general for all types of apparatus and devices flying in the sky for conventional or special use, such as agricultural spray, observation, High Altitude Long Operation Telecommunication by Aircraft (HALO), and the like, with or without pilot aboard, with the ease of being radio operated from the ground because of the automatic flight stability and the resistance to slide, spin, and nose down stall. The present invention may also be used in spacecraft recovery because of these same advantages and the ability to realize slow and soft vertical landings without damage to the craft or the equipment on board.

These and other features and advantages of the present invention will become apparent with those skilled in the art, and some changes and details are able for modifications or additions without departing from the present invention.

I claim:

1. A ground effect flying craft comprising:

a fuselage;

a pivoting wing, having an auto-stable airfoil, positioned and attached at a forward portion of the fuselage at a first, high position above the center of gravity of the fuselage, the pivoting wing being allowed at least limited pivot movement along its lateral axis; and at least one pivoting spoiler wing, having substantially the same wingspan as the pivoting wing and having a different airfoil type than the pivoting wing, positioned and attached to the fuselage behind and lower than the pivoting wing, at a sufficient distance from the pivoting wing so as to pull airflow from the pivoting wing and deflect the airflow from the pivoting wing downwardly, wherein the pivoting wing pivots independently of movement of the pivoting spoiler wing.

2. The ground effect flying craft of claim 1, wherein the at least one pivoting spoiler wing is located at a vertical distance below the pivoting wing substantially 25% of the length of the chord of the pivoting wing.

3. The ground effect flying craft of claim 2, wherein the at least one pivoting spoiler wing is located at a horizontal distance behind the pivoting wing of substantially 100% the length of the chord of the pivoting wing.

4. The ground effect flying craft of claim 3, wherein the at least one pivoting spoiler wing has substantially the same chord as the pivoting wing.

5. The ground effect flying craft of claim 4, wherein the pivoting wing is provided with a trailing edge without any flaps or ailerons.

6. The ground effect flying craft of claim 5 wherein the at least one pivoting spoiler wing is inclined at an angle substantially equal to one degree more than the angle of the descendent airstream proceeding from the pivoting wing.

7. The ground effect flying craft of claim 6, wherein the at least one pivoting spoiler wing has a hollow lower camber aircraft airfoil.

8. The ground effect flying craft of claim 1, wherein said at least one pivoting spoiler wing comprises:

a first pivoting spoiler wing located at a vertical distance below the pivoting wing substantially 25% of the length of the chord of the pivoting wing and located at a horizontal distance behind the pivoting wing of substantially 100% the length of the chord of the pivoting wing, the first pivoting spoiler wing and having substantially the same span and chord as the pivoting wing and is provided with a trailing edge without any flaps or ailerons, the first pivoting spoiler wing being inclined at an angle substantially equal one degree more than the angle of the descendent airstream proceeding from the pivoting wing and having a hollow lower camber aircraft airfoil; and a second pivoting spoiler wing located at a vertical distance below the first pivoting spoiler wing substantially 25% of the length of the chord of the first pivoting spoiler wing and located at a horizontal distance behind the first pivoting spoiler wing of substantially 100% the length of the chord of the first pivoting spoiler wing, and having the substantially the same span and chord as the first pivoting spoiler wing and is provided with a trailing edge without any flaps or ailerons, and having a hollow lower camber aircraft airfoil.

9. The ground effect flying craft of claim 8, wherein the second pivoting spoiler wing is inclined at an angle substantially equal one degree more than the angle of the descendent airstream proceeding from the first pivoting spoiler wing.

10. The ground effect flying craft of claim 1, wherein the pivoting wing has an airfoil comprised of the NACA 2.30 family of auto-stable airfoils.

11. The ground effect flying craft of claim 1, wherein the pivoting wing is provided with a trailing edge without any flaps or ailerons.

12. The ground effect flying craft of claim 1, further comprising:

a control stick or yoke, coupled to the pivoting wing, for allowing pilot control of the angle of incidence of the pivoting wing.

13. The ground effect flying craft of claim 1 wherein the general center of gravity of the craft is located at a position beneath the levels of the pivoting wing and the at least one pivoting spoiler wing.

14. The ground effect flying craft of claim 13, wherein the general center of gravity may be adjusted within a range from 23% to 48% of the total distance between the leading edge of the pivoting wing to the trailing edge of a rearmost of the at least one pivoting spoiler wing.

15. The ground effect flying craft of claim 1, wherein the fuselage comprises a floating hull with a rectangular bottom.

16. The ground effect flying craft of claim 15, wherein the bottom of the floating hull has a transverse cross-section which is flat.

17. The ground effect flying craft of claim 16, wherein the bottom of the floating hull has a longitudinal cross-section having a hollow lower camber shape.

* * * * *